United States Patent
Gustafsson et al.

(10) Patent No.: US 8,346,488 B2
(45) Date of Patent: Jan. 1, 2013

(54) DEVICES FOR MEASURING A FORCE, MONITORING A MACHINING TOOL, AND COMPENSATING FOR A DEFLECTION

(75) Inventors: Martin Gustafsson, Trollhättan (SE); Fredrik Gunnberg, Karlstad (SE); Tobias Persson, Kungsbacka (SE)

(73) Assignee: Aktiebolaget SKF, Göteborg (SE)

( * ) Notice: Subject to any disclaimer, the term of this patent is extended or adjusted under 35 U.S.C. 154(b) by 502 days.

(21) Appl. No.: 12/311,273

(22) PCT Filed: Sep. 25, 2006

(86) PCT No.: PCT/SE2006/001088
§ 371 (c)(1),
(2), (4) Date: Apr. 23, 2010

(87) PCT Pub. No.: WO2008/039113
PCT Pub. Date: Apr. 3, 2008

(65) Prior Publication Data
US 2010/0204930 A1    Aug. 12, 2010

(51) Int. Cl.
G01F 5/00    (2006.01)
G01L 1/00    (2006.01)
(52) U.S. Cl. .......................... 702/41; 702/47
(58) Field of Classification Search .............. 702/47, 702/50, 42
See application file for complete search history.

(56) References Cited

U.S. PATENT DOCUMENTS

| 3,466,951 A | | 9/1969 | Greenberg | |
|---|---|---|---|---|
| 3,717,392 A | | 2/1973 | Ennis | |
| 3,906,681 A | * | 9/1975 | Seidel | 451/26 |
| 4,193,644 A | | 3/1980 | Miyashita et al. | |
| 4,504,048 A | * | 3/1985 | Shiba et al. | 269/71 |
| 6,165,142 A | * | 12/2000 | Bar | 600/595 |

FOREIGN PATENT DOCUMENTS

GB    1350522 A    4/1974

* cited by examiner

*Primary Examiner* — Cindy H Khuu
*Assistant Examiner* — Manuel Rivera Vargas
(74) *Attorney, Agent, or Firm* — Mark A. Ussai; Bryan Peckjian

(57) ABSTRACT

A device (1) for measuring a force acting between a machining tool (4) and a work piece in a processing machine is disclosed. It comprises an arrangement of at least two hydrostatic pads (7), wherein the at least two hydrostatic pads are designed to receive and support a mounting part (10) of the machining tool (4), and each hydrostatic pad of the at least two hydrostatic pads (7) presenting a pressure sensor (13), a calculation unit (16) for —reading hydrostatic pad pressure related to the pressure sensors (13) and a constant based on characteristics of each one of the at least two hydrostatic pads (7), —calculating the force by calculating a difference between the products of, for each hydrostatic pad of the at least two hydrostatic pads (7), the hydrostatic pad pressure and the constant, and —indicating the force. Also, a device for monitoring a machining tool and a device for compensating for a deflection of a machining tool when machining a work piece comprising the device are disclosed.

9 Claims, 4 Drawing Sheets

DEVICES FOR MEASURING A FORCE, MONITORING A MACHINING TOOL, AND COMPENSATING FOR A DEFLECTION

TECHNICAL FIELDS

The present invention relates to the following aspects.

According to a first aspect of the present invention, it relates to a device for measuring a force acting between a machining tool and a work piece in a processing machine.

According to a second aspect of the present invention, it relates to a device for monitoring a machining tool based on the first aspect.

According to a third aspect of the present invention, it relates to a device for compensating for a deflection of a machining tool when machining a work piece, based on the first aspect.

BACKGROUND OF INVENTION

Developments during the last decades in the field of electronics has lead to increased opportunities of incorporating electronics in traditionally mechanical fields, leading to increased technical performance.

SUMMARY OF INVENTION

According to the first aspect of the present invention a device for measuring a force acting between a machining tool and a work piece in a processing machine is disclosed. The device comprises:

An arrangement of at least two hydrostatic pads, wherein the at least two hydrostatic pads are designed to receive and support a portion for receiving a mounting part of the machining tool, and each hydrostatic pad of the at least two hydrostatic pads presenting a pressure sensor, A calculation unit for reading hydrostatic pad pressure related to the pressure sensors and a constant based on characteristics of each one of the at least two hydrostatic pads, calculating the force by calculating a difference between the products of, for each hydrostatic pad of the at least two hydrostatic pads, the hydrostatic pad pressure and the constant, indicating the force.

The term 'supports' implies that it is possible for the pads to control and limit the movement of the machining tool so that the machining tool may function properly in the machining process. In an embodiment, the device comprises the machining tool.

The present invention offers advantages such as increased quality of the work piece since it is possible to monitor the force acting between the machining tool and the work piece. Also, it is possible to indicate, and thus control, form error/deviations of the machining tool and/or the work piece.

In an embodiment, the calculation unit compensates for the impact of gravity. In case gravity has an impact of the pressure sensor, e.g. the machining tool is supported more heavily by a specific pad as compared to other pads, then there may be a need to compensate for this additional force. The compensation may be done e.g. by calibrating the device when the machining tool is supported by the pads but is not in use, i.e. the force active in the device is the force of gravity. Alternatively, the gravity may be compensated by an offset in the formulae.

In an embodiment, the constant is the same for two or more of the hydrostatic pads. In an embodiment, the constants are different.

In an embodiment, the calculation unit indicates the force by at least one of triggering an alarm, storing the force in a memory, updating a log, and presenting the force to an operator/supervisor using a display means. This offers the advantage that it is possible to in retrospect go back to analyse data logs to see at what time what force acted between a machining tool and a work piece. With the force information the product quality will increase and also the traceability. The force measurements from each work piece may be saved which makes it possible to track if broken work pieces have failed because of dimension or form error from insufficient fabrication.

In an embodiment, the characteristics related to a constant include at least one of geometrical shape and orientation of the hydrostatic pads.

In an embodiment, the calculation unit reads and calculates the force either in real time, or at a point in time after a measuring, e.g. after 1 hour, 6 hours, 24 hours, two days, or a week, or at another point in time.

In an embodiment, the calculation unit is one of:
electrically remote in relation to the arrangement, and
electrically near the arrangement. The term electrically implies here that there is an electrical connection connecting the calculation unit and the arrangement. It may be cable or wireless. Remote implies a distance meaning that the distance is longer than a minimum distance required for accomplishing a proper function of the device. The calculation unit being near the arrangement implies here that the unit is quite close to the arrangement.

In an embodiment, one or more of the hydrostatic pads present a preload pressure.

In a non-limiting application, hard turning, the information of tool wear will extend the time between insert changes. In this way manufacturing cost will decrease. Tests have shown that the force acting on the cutting edge depend on insert wear. The force increases as the insert gets worn. By monitoring the force you can decide when it is time for insert change. This can be done automatically. It is also possible to predict and alarm failure. In an embodiment, the device further comprises a second calculation unit, e.g. for subsequent monitoring and pressure sensor data processing. Thus, the calculation may store data in memory for later retrieval and processing, possibly at another location.

According to the second aspect of the present invention, a device for monitoring a machining tool is disclosed. It comprises the device according to the first aspect, and a reference incorporated in a memory able to communicate with the calculation unit. The calculation unit 1) reads the reference from the memory, 2) compares the force and the reference, and 3) indicates a correspondence between the reference and the force. In non-limiting embodiments, the correspondence is indicated using a screen/monitor, alarm, or updating a log. An advantage is that this aspect offers the opportunity of indicating, and thus allowing control of, machining tool wear. This will decrease the risk of breakdown.

According to the third aspect of the present invention, a device for compensating for a deflection of a machining tool when machining a work piece is disclosed. It comprises the device according to the first aspect, and a reference incorporated in a memory able to communicate with the calculation unit. The reference includes a "should value" of the magnitude of a force corresponding to a desired deflection. The force provided by the device according to the first aspect corresponds to an "is value". A control algorithm, e.g. of a regulator type, known to the person skilled in the art is used to accommodate the compensation. The calculation unit 1) reads the reference from the memory, 2) compares the force and the reference, and 3) compensates for the deflection by using a deflection compensating means.

In an embodiment, applicable to all three aspects, the present invention is not limited to measuring the force exerted on a machining tool but to measuring the force exerted on a shaft supported by one or more hydrostatic bearings.

PREFERRED EMBODIMENTS

Figure 1:
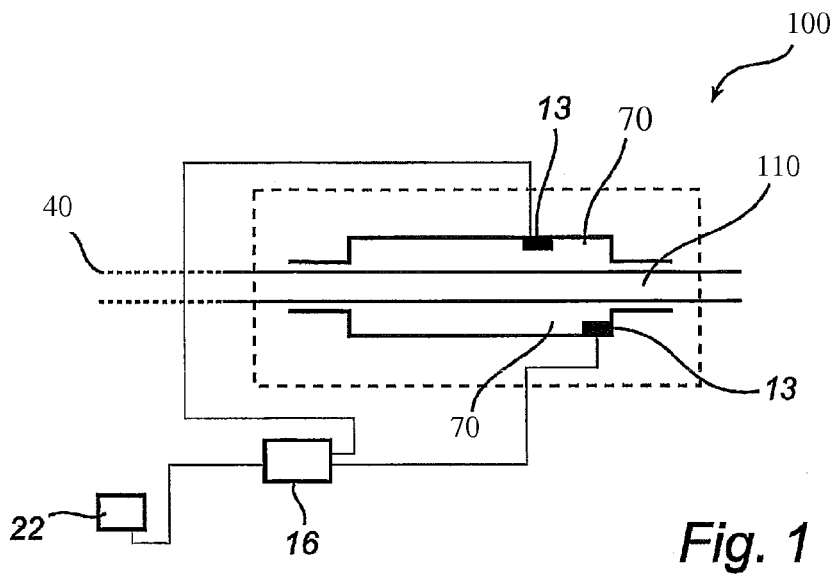
In FIG. 1, a schematic illustration of a device according to the present invention is given.

In FIG. 1, an embodiment of a device 100 for measuring a force acting between a machining tool 40 and a work piece in a processing machine is given. It comprises an arrangement of at least two hydrostatic pads 70. The at least two hydrostatic pads 70 are designed to receive and support a mounting part 110 of the machining tool 40. Each hydrostatic pad 70 of the at least two hydrostatic pads presents a pressure sensor 13. A calculation unit 16 reads hydrostatic pad pressure related to the pressure sensors 70 and a constant based on characteristics of each one of the at least two hydrostatic pads 70. Then the calculation unit 16 calculates the force by calculating a difference between the products of, for each hydrostatic pad 70 of the at least two hydrostatic pads, the hydrostatic pad pressure and the constant. The resulting force is indicated. In an embodiment, the pressure is intermediately stored for later processing.

Figure 2A:
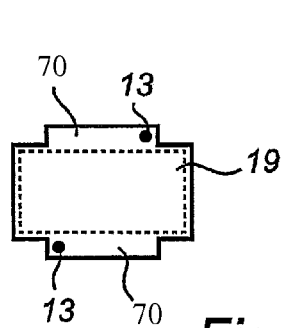
In FIGS. 2A, 2B, and 2C, schematic cross section views of embodiments of pads, pressure sensors, and the intended location of the machining tool.
Figure 2B:
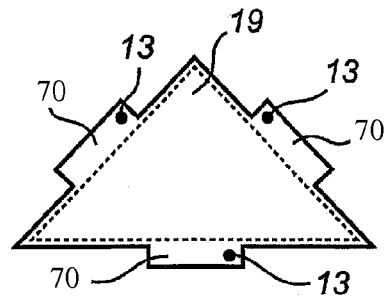
Figure 2C:
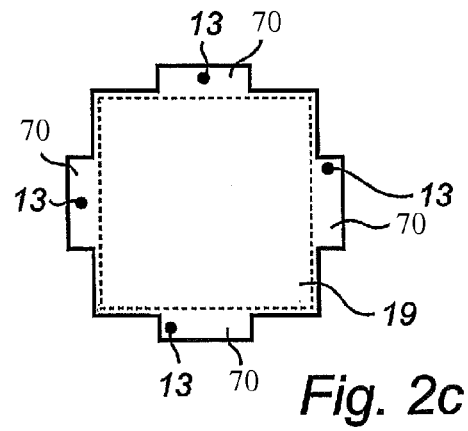

In FIGS. 2A-2C, schematic cross section views of embodiments of pads 70, pressure sensors 13 (electrical communications means from the pressure sensors 13 not shown), an intended location of a mounting part 19 of the machining tool 40, i.e. where it is to be inserted or mounted into the device 100, is indicated by the dotted line.

In an embodiment, the calculation unit 16 compensates for the impact of gravity. In an embodiment, this is done by calibrating the device 100 before machining, or even calibrating the device 100 at time intervals or when considered necessary. In an embodiment, the calculation unit 16 uses an off set to compensate for the force of gravity.

In an embodiment, the constant is the same for two or more of the hydrostatic pads 70. The constant is based on characteristics of at least one of geometrical shape and orientation of the hydrostatic pads 70.

$$F = \int_A P da = \ldots = P_r \times (\text{geom. parameters}) = P_r \times C$$

Integrating the pressure distribution over the area A, at which the pressure distribution P is acting, gives the resulting force F. F will be a function of the measured recess pressure Pr and a constant C calculated using the surface integral above. C will thereby depend on pad geometry. Use of basic hydrostatic equations will lead to the expression of the pressure distribution P.

In an embodiment, the calculation unit 16 indicates the force by at least one of triggering an alarm, storing the force in a memory, updating a log, and presenting the force to an operator/supervisor using a display means, or an indicating means 22.

In an embodiment, the calculation unit 16 reads and calculates the force either in real time, or at a point in time after a measuring.

In an embodiment, the calculation unit 16 is electrically near the arrangement, i.e. in close proximity of the pads 70.

Figure 3:
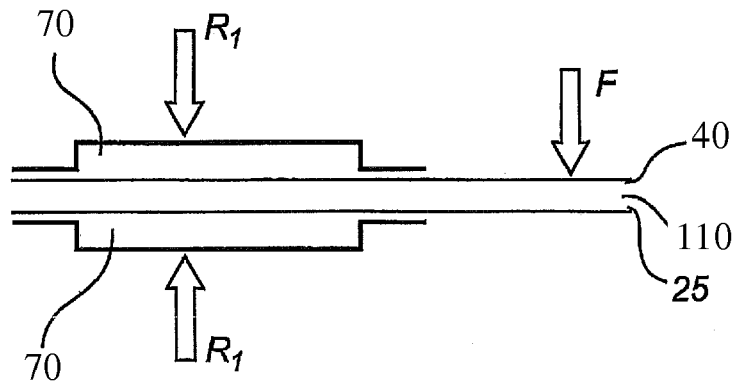
In FIG. 3, a schematic illustration of forces acting on two hydrostatic pads being arranged opposite to each other is given.

Another embodiment will now be discussed. Hydrostatic pads 70 may be used to support a machining tool 40, a mounting part 110, or a shaft 25. Two pads 70, placed opposed to each other as in FIG. 3, will prevent a shaft 25 from moving in the vertical direction. Since hydrostatic pads 70 are preloaded, the forces $R_1$ and $R_2$ are acting on the axis even if no load is applied to the axis. If the weight of the axis is neglected, $R_1$ and $R_2$ have to be equal due to equilibrium. However, when a force, F, is applied, the force equilibrium yields $$F = R_2 - R_1.$$

This means that if the new $R_1$ and $R_2$ are known, F can be calculated. The force developed by a hydrostatic pad 70 depends on recess pressure (pressure inside the hydrostatic pocket) and geometry of the pocket.

$$R = Pr^*C,$$

where C is a constant depending on the geometry of the pad. An expression for the applied force F can now be stated;

$$F = P_{r,2}^* C2 - P_{r,1}^* C_1.$$

If the two pads 70 have the same geometry, $C_1$ and $C_2$ will be equal. The equation then becomes $F = (P_{r,2} - P_{r,1})^* C$. It can be seen that by measuring the pressure in each recess the applied force can be calculated. In the case with equal pad geometry, measurement of the pressure difference between the pockets will be enough to specify the applied load.

The mass of the supported machine part will not cause any trouble in the calculations above. One way is to calibrate $R_1$ and $R_2$ so that they are both zero when no load is applied. Another way is to consider the weight in the equilibrium equation;

$$F = (P_{r,2} - P_{r,1})^* C - mg.$$

Figure 4:
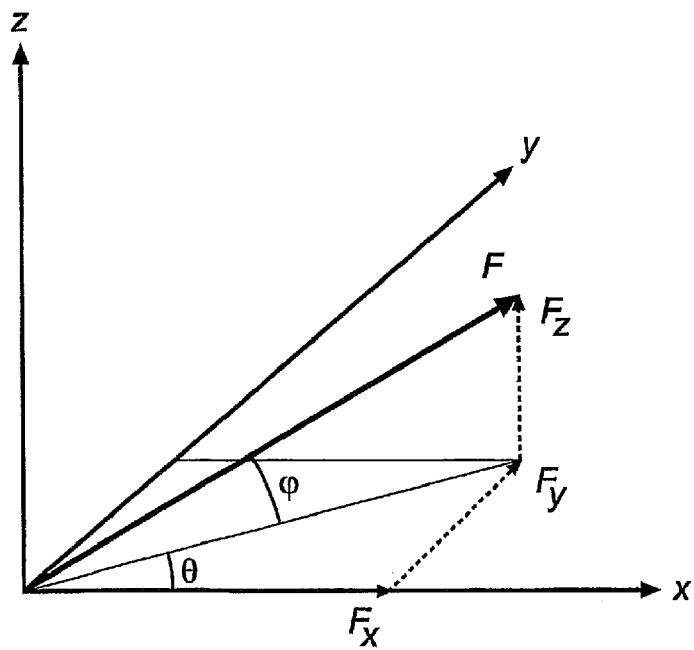
In FIG. 4, a schematic illustration of a three dimensional representation of the present invention is given.

In another embodiment, the one dimensional reasoning in the previous embodiment is generalized to three dimensions. Any number, from one to n, of hydrostatic pads 70 may be used to support a machining tool 40, a mounting part 110, or a shaft 25. The pads 70 can be placed in any orientation, specified by two angles according to FIG. 4. In that way an arrangement of pads 70 can prevent, or control, movement in different directions. The force developed by a pad 70 called F, is always normal to the pad plane. The principle may be configured to determine an applied force in all directions. By supporting the machining tool 40 in all directions using hydrostatic pads 70 it is possible to measure the force in all directions.

$$F_x = \sum_{i=1}^{n} (P_i \times C_i \times \cos\varphi_i \times \cos\theta_i)$$

$$F_y = \sum_{i=i}^{n} (P_i \times C_i \times \cos\varphi_i \times \sin\theta_i)$$

$$F_z = \sum_{i=1}^{n} (P_i \times C_i \times \sin\varphi_i)$$

Pi is the recess pressure in pocket i. Ci is a constant dependent on the geometry of pad number i. In this embodiment the Cartesian coordinate system is used. However, it is pointed out that other coordinate systems are also applicable. This is done by studying the three different directions x, y and z separately. The restoring force, R, in one direction will be the sum of the forces from all pads 70 that are non-parallel to the specific direction.

Figure 5:
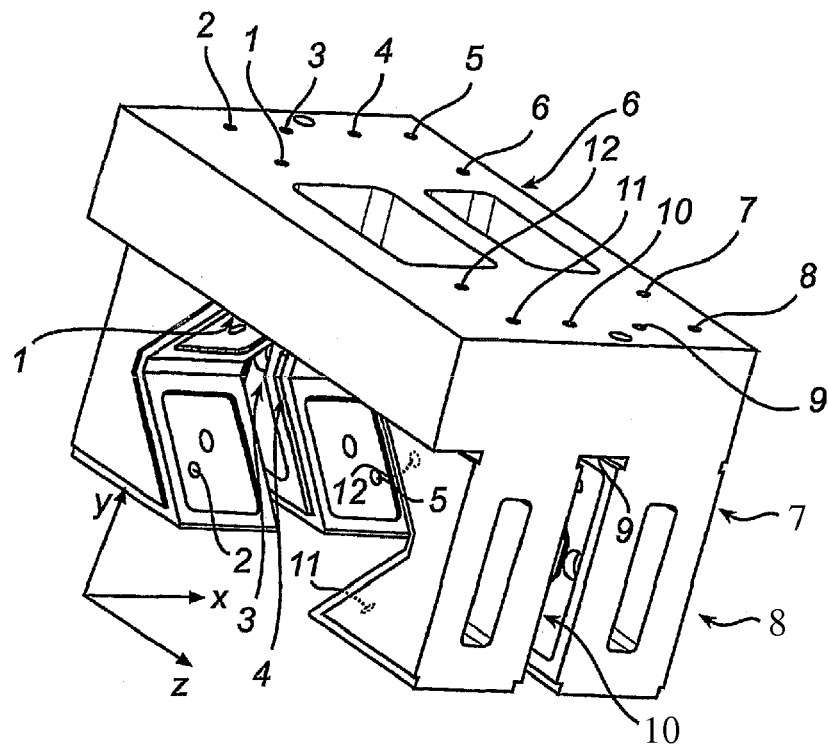
In FIG. 5, a schematic illustration of a device according to the present invention is given.

In FIG. 5, an embodiment is shown in which the placement of hydrostatic pads 70 is at an angle of 45 degrees. The numerals in FIG. 5 are indices of the formulae presented below, i.e. '1' in FIG. 5 implies reacting force $R_1$. Also, '1' implies that there is a connection through the device 100 from a pad with index '1'. This means that it is possible to connect a pressure sensor at connection '1'. In x direction the pads 70 are triangular shaped. In y and z directions the pads 70 are rectangular. Force equilibrium in the y-direction yields $$F_y = (R_1 + R_6 + R_7 + R_{12} - R_2 - R_5 - R_8 - R_{11}) \times \cos 45°$$

With $R_i = P_{r,i} \times C_i$ $$F_y = (P_{r,i} \times C_1 + P_{r,6} \times C_6 + P_{r,7} \times C_7 + P_{r,12} \times C_{12} - P_{r,2} \times C_2 - P_{r,5} \times C_5 - P_{r,8} \times C_8 - P_{r,11} \times C_{11}) \times \cos 45°$$

If the pad geometry is the same for all pads restoring force in the specific direction, as in this case, the equation can be rewritten as $$F_y = (P_{r,1} + P_{r,6} + P_{r,7} + P_{r,12} - P_{r,2} - P_{r,5} - P_{r,8} - P_{r,11}) \times C_y \times \cos 45°$$

In the same way $$F_x = (P_{r,4} + P_{r,9} - P_{r,3} - P_{r,10}) \times C_x$$

$$F_z = (P_{r,7} + P_{r,8} + P_{r,11} + P_{r,12} - P_{r,1} - P_{r,2} - P_{r,5} - P_{r,6}) \times C_z \times \cos 45°$$

The expressions within parenthesis can be rewritten so that $$F_x = ([P_{r,4} - P_{r,3}] + [P_{r,9} - P_{r,10}]) \times C_x$$

$$F_y = ([P_{r,1} - P_{r,8}] + [P_{r,6} - P_{r,11}] + [P_{r,7} - P_{r,2}] + [P_{r,12} - P_{r,5}]) \times C_y \times \cos 45°$$

$$F_z = (-[P_{r,1} - P_{r,8}] - [P_{r,6} - P_{r,11}] + [P_{r,7} - P_{r,2}] + [P_{r,12} - P_{r,5}]) \times C_z \times \cos 45°$$

As can be seen above, it is possible to calculate all component forces of the applied load if the pressure in each pocket is measured. In the special case with equal pad geometry in each direction, it is enough to measure a pressure difference between six appropriate pockets and still be able to calculate the component forces. Vector addition will in both cases result in the desired resultant force. Now turning to the calculations of the constants, the constants are in this embodiment calculated according to the formulas below.

$$C_x = A_{recess} + \frac{L \times z}{2} - 1.25 \times \left( \pi \times R_1^2 + \frac{\pi \times (R_1^2 - R_2^2)}{2 \times \ln\left(\frac{R_2}{R_1}\right)} \right)$$

$$C_y = C_z = \left( A_{recess} + \frac{L \times z}{2} - \pi \times R_1^2 - \frac{\pi \times (R_1^2 - R_2^2)}{2 \times \ln\left(\frac{R_2}{R_1}\right)} \right),$$

wherein $A_{recess}$ denotes the recess area, L is land width, z is land length, $R_1$ is inner corner radius, and $R_2$ is outer corner radius. Cx denotes triangular recess shapes. Cy, and Cz denote rectangular recess shapes.

Figure 6:
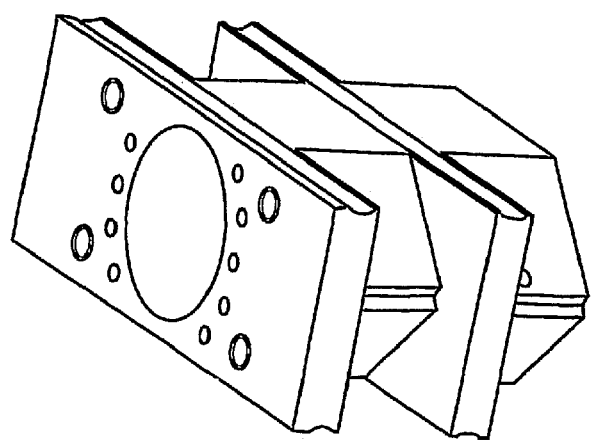
In FIG. 6, a schematic embodiment of a mounting part of the machining tool is disclosed.

In FIG. 6, an embodiment of the mounting part 110 of a machining tool 40 is disclosed. The mounting part 110 is an adapter that fits into the portion for receiving and supporting a machining tool of the device 100, as shown in FIG. 5.

Figure 7:
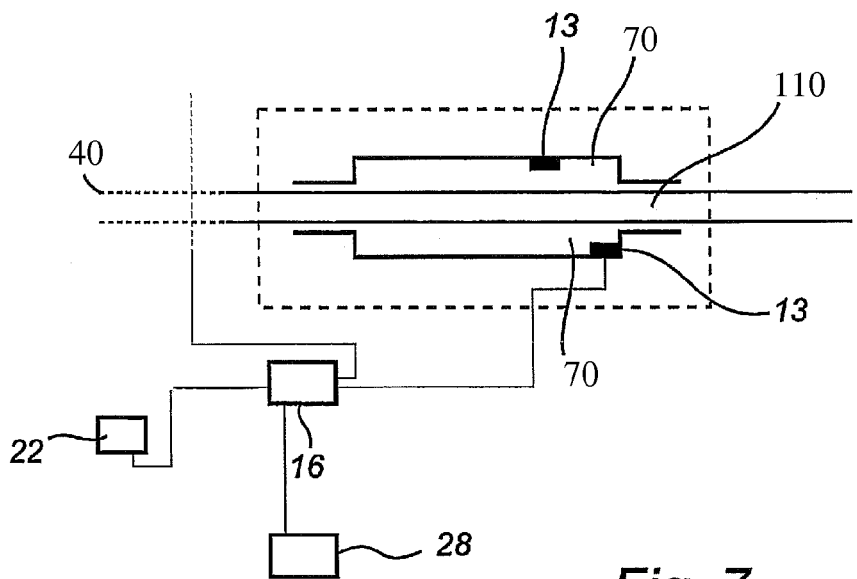
In FIG. 7, a schematic illustration of a device according to the present invention when incorporated in a device for monitoring a machining tool is given.

In an embodiment, shown in FIG. 7, a device for monitoring a machining tool is disclosed. It comprises the device 100 according to the first aspect. However it also comprises a reference 28 incorporated in a memory able to communicate with the calculation unit 16, which reads the reference 28 from the memory, compares the force and the reference 28, and indicates a correspondence between the reference 28 and the force.

Figure 8:
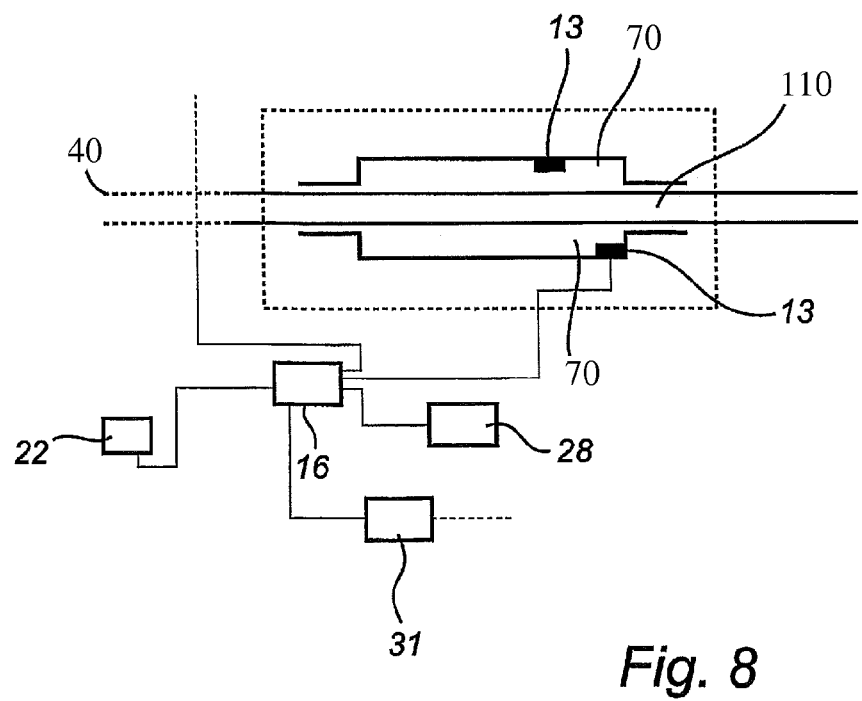
In FIG. 8, a schematic illustration of a device according to the present invention when incorporated in a device for compensating for a deflection of a machining tool when machining a work piece is given.

In an embodiment, shown in FIG. 8, a device for compensating for a deflection of a machining tool 40 when machining a work piece. It comprises the device 100 according to the first aspect, and a reference 28 incorporated in a memory in electrical communication with the calculation unit 16, which reads the reference 28 from the memory, compares the force and the reference 28, and compensates for the deflection by using a deflection compensating means 31. The compensating is based on a regulating algorithm available to the person skilled in the art.

The invention claimed is:

1. A device for measuring a force acting between a machining tool and a work piece in a processing machine, comprising:
   an arrangement of at least two hydrostatic pads, wherein the at least two hydrostatic pads are designed to receive and support a mounting part of the machining tool, and each of the at least two hydrostatic pads includes a pressure sensor,
   a calculation unit configured to read hydrostatic pad pressure related to the pressure sensors and a constant based on characteristics of each one of the at least two hydrostatic pads, to calculate the force by calculating a difference between the products of the hydrostatic pad pressure and the constant for each hydrostatic pad of the at least two hydrostatic pads, and to indicate the force.

2. The device according to claim 1, wherein the calculation unit is configured to compensate for gravity.

3. The device according to claim 1, wherein the constant is the same for at least two of the hydrostatic pads.

4. The device according to claim 1, wherein the calculation unit indicates the force by at least one of triggering an alarm, storing the force in a memory, updating a log, and presenting the force to an operator/supervisor using a display means.

5. The device according to claim 1, wherein the characteristics of each hydrostatic pad include at least one of geometrical shape and orientation.

6. The device according to claim 1, wherein the calculation unit is configured to calculate the force one of in real time and at a point in time after reading hydrostatic pressure.

7. The device according to claim 1, wherein the calculation unit is one of remote in relation to the arrangement of the pads and proximal to the arrangement of the pads.

8. A device for monitoring a machining tool, comprising:
an arrangement of at least two hydrostatic pads, wherein the at least two hydrostatic pads are designed to receive and support a mounting part of the machining tool, and each of the at least two hydrostatic pads includes a pressure sensor,
a calculation unit configured to read hydrostatic pad pressure related to the pressure sensors and a constant based on characteristics of each one of the at least two hydrostatic pads, to calculate the force by calculating a difference between the products of the hydrostatic pad pressure and the constant for each hydrostatic pad of the at least two hydrostatic pads, and to indicate the force, and
a memory configured to communicate with the calculation unit and having a stored reference,
wherein the calculation unit is further configured to read the reference from the memory, to compare the force and the reference, and to indicate a correspondence between the reference and the force.

9. A device for compensating for a deflection of a machining tool when machining a workpiece, comprising:
an arrangement of at least two hydrostatic pads, wherein the at least two hydrostatic pads are designed to receive and support a mounting part of the machining tool, and each of the at least two hydrostatic pads includes a pressure sensor,
a calculation unit configured to read hydrostatic pad pressure related to the pressure sensors and a constant based on characteristics of each one of the at least two hydrostatic pads, to calculate the force by calculating a difference between the products of the hydrostatic pad pressure and the constant for each hydrostatic pad of the at least two hydrostatic pads, and to indicate the force, and
a memory configured to communicate with the calculation unit and having a stored reference,
wherein the calculation unit is further configured to read the reference from the memory, to compare the force and the reference, and to compensate for the deflection using a deflecting compensating means.

* * * * *